(12) United States Patent
Huang et al.

(10) Patent No.: US 9,965,776 B2
(45) Date of Patent: *May 8, 2018

(54) DIGITAL CONTENT RECOMMENDATIONS BASED ON USER COMMENTS

(71) Applicant: Verizon and Redbox Digital Entertainment Services, LLC, Basking Ridge, NJ (US)

(72) Inventors: Jian Huang, Sudbury, MA (US); Gong Zhang, Waltham, MA (US); Gaurav D. Mehta, Brookline, MA (US); Jianxiu Hao, Acton, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 1033 days.

This patent is subject to a terminal disclaimer.

(21) Appl. No.: 14/143,269

(22) Filed: Dec. 30, 2013

(65) Prior Publication Data

US 2015/0186947 A1    Jul. 2, 2015

(51) Int. Cl.
*G06Q 30/02* (2012.01)

(52) U.S. Cl.
CPC ................. *G06Q 30/0269* (2013.01)

(58) Field of Classification Search
CPC .................. G06Q 30/0207; G06Q 30/0277
See application file for complete search history.

(56) References Cited

U.S. PATENT DOCUMENTS

| | | | | |
|---|---|---|---|---|
| 8,516,374 B2* | 8/2013 | Fleischman | ............ | G06Q 30/02 715/716 |
| 8,554,640 B1* | 10/2013 | Dykstra | ............... | G06Q 10/101 705/14.49 |
| 9,088,823 B1* | 7/2015 | Price | .................. | H04N 21/4667 |
| 9,129,008 B1* | 9/2015 | Kuznetsov | ........ | G06F 17/30616 |
| 9,467,744 B2* | 10/2016 | Zhang | ................ | G06F 17/3082 |
| 2007/0115256 A1* | 5/2007 | Lee | .......................... | G09G 5/14 345/156 |
| 2008/0097758 A1* | 4/2008 | Li | ....................... | G06F 17/2715 704/240 |
| 2008/0109391 A1* | 5/2008 | Chan | ....................... | G06N 5/00 706/45 |
| 2008/0133488 A1* | 6/2008 | Bandaru | .......... | G06F 17/30864 |

(Continued)

OTHER PUBLICATIONS

Pang et al., Opinion Mining and Sentiment Analysis, in Foundations and Trends in Information Retrieval, vol. 2, No. 1-2, 2008.*

*Primary Examiner* — David J Stoltenberg

(57) ABSTRACT

A method and system relate to receiving first comments, associated with first digital content, that are submitted by a first user, and determining an opinion of the first user with respect to the first digital content based on the one or more first comments. Determining the opinion of the first user with respect to the first digital content includes parsing the one or more first comments to determine a term included in the one or more first comments, and determining the opinion based on the term. The first user is clustered with second users who share the first users opinion regarding the first digital content. Second digital content, liked by at least one of the second users and have accessed by the first user, are identified, and a recommendation identifying the second digital content is presented for display to the first user.

20 Claims, 8 Drawing Sheets

(56) References Cited

U.S. PATENT DOCUMENTS

| | | | |
|---|---|---|---|
| 2008/0189733 A1* | 8/2008 | Apostolopoulos | H04N 7/17318 725/28 |
| 2009/0144780 A1* | 6/2009 | Toebes | G06Q 10/00 725/87 |
| 2009/0265332 A1* | 10/2009 | Mushtaq | G06F 17/30 |
| 2009/0271417 A1* | 10/2009 | Toebes | G06F 17/3087 |
| 2009/0271524 A1* | 10/2009 | Davi | H04N 21/23433 709/231 |
| 2012/0101805 A1* | 4/2012 | Barbosa | G06F 17/27 704/9 |
| 2012/0131021 A1* | 5/2012 | Blair-Goldensohn | G06F 17/30719 707/750 |
| 2014/0068406 A1* | 3/2014 | Kornacki | G06F 17/241 715/230 |
| 2014/0365207 A1* | 12/2014 | Convertino | G06F 17/2785 704/9 |
| 2015/0066583 A1* | 3/2015 | Liu | G06Q 30/0255 705/7.29 |
| 2015/0186368 A1* | 7/2015 | Zhang | G06F 17/3082 707/740 |

\* cited by examiner

FIG. 4

| | Movie 1 | Movie 2 | Movie 3 | Movie 4 | Movie 5 |
|---|---|---|---|---|---|
| USER A | LIKE (430-A-1) | LIKE (430-A-2) | DISLIKE (430-A-3) | | |
| USER B | LIKE (430-B-1) | LIKE (430-B-2) | DISLIKE (430-B-3) | LIKE (430-B-4) | DISLIKE (430-B-5) |
| USER C | DISLIKE (430-C-1) | DISLIKE (430-C-2) | LIKE (430-C-3) | DISLIKE (430-C-4) | LIKE (430-C-5) |

400
420
410

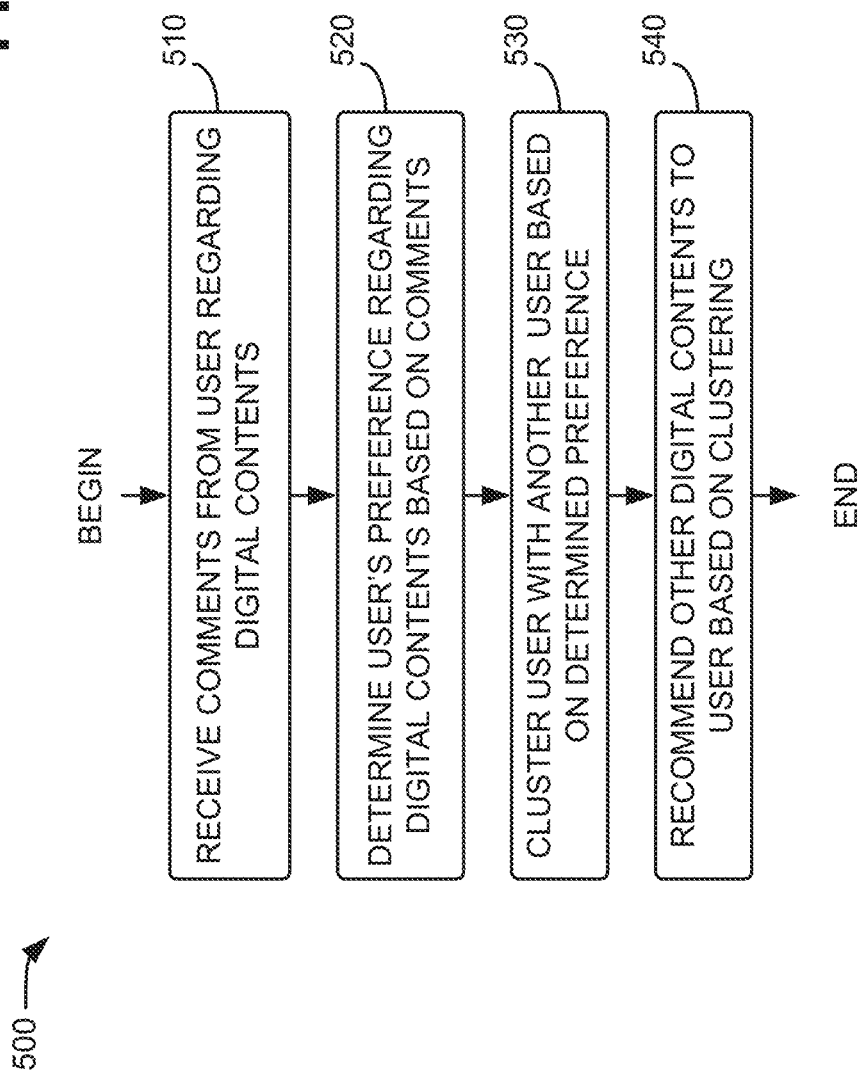

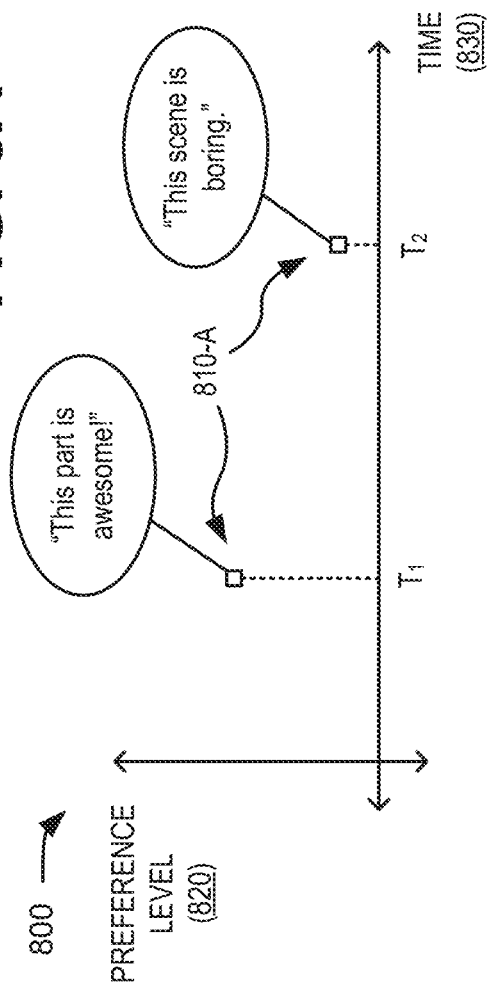

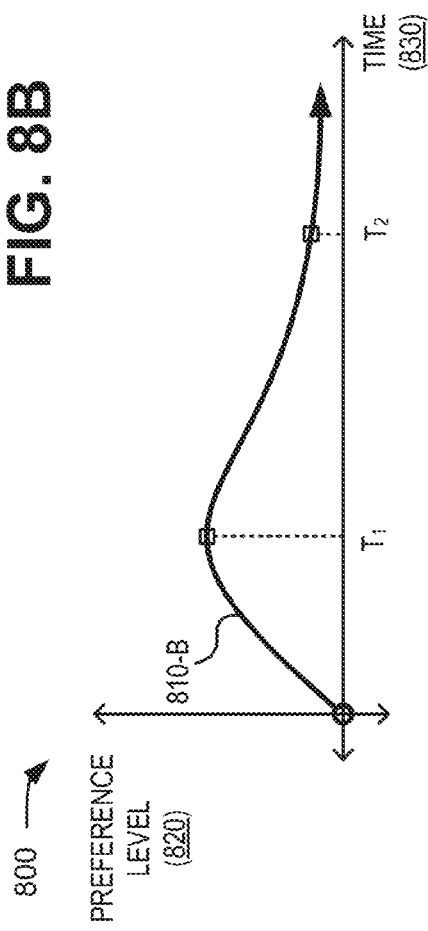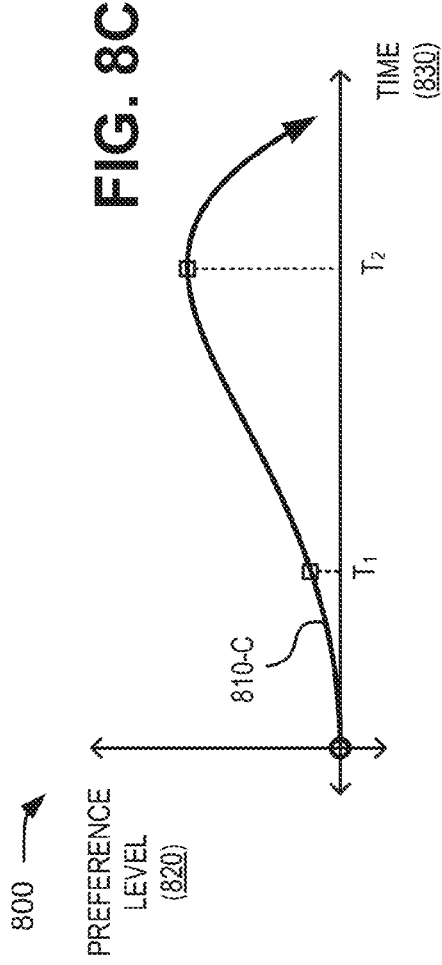

DIGITAL CONTENT RECOMMENDATIONS BASED ON USER COMMENTS

BACKGROUND

Modern communications enable a user to access a large quantity of digital content. To assist the user in selecting from the digital content, a service provider may provide a catalog identifying available digital content. The user may search the catalog by keyword(s) or browse the product list. In some instances, the catalog may also provide recommendations based on the user's profile, viewing history or purchase history.

BRIEF DESCRIPTION OF THE DRAWINGS

FIG. 4 shows an exemplary table 400 that may be stored by a recommendation device included in the system of FIG. 2;

FIG. 5 is a flow diagram of an exemplary process for recommending digital content based on user comments;

FIGS. 8A-8C show graphs depicting different exemplary preference profiles reflecting a user's opinions regarding different portions of digital content.

DETAILED DESCRIPTION OF PREFERRED EMBODIMENTS

The following detailed description refers to the accompanying drawings. The same reference numbers in different drawings may identify the same or similar elements.

In accordance with an implementation described herein, comments regarding digital content may be received from users, and the comments may be processed to determine the users' opinion regarding the digital content (e.g., whether the users liked/disliked the digital content). Users having similar opinions (i.e., users submitting similar comments regarding a set of digital content) are identified, and digital content viewed or liked by (e.g., receiving favorable comments from) the one of the identified users are identified to another one of the identified users as a recommendation.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device. "Digital content," as referred to herein, includes one or more units of digital content that may be provided to a customer. The unit of digital content may include, for example, a segment of text, a defined set of graphics, a uniform resource locator (URL), a script, a program, an application or other unit of software, a media file (e.g., a movie, television content, music, etc.), a document, or an interconnected sequence of files (e.g., hypertext transfer protocol (HTTP) live streaming (HLS) media files).

Figure 1:
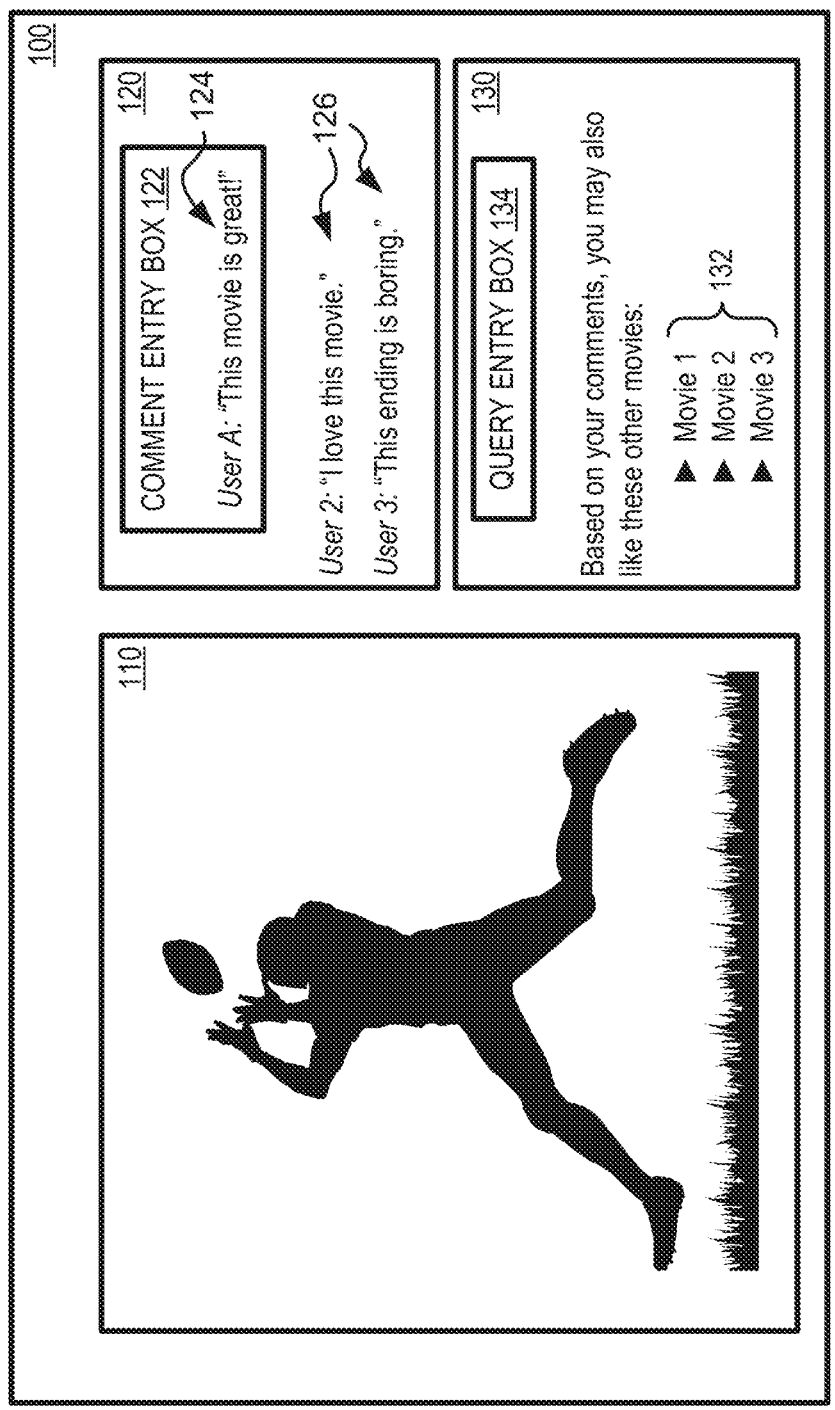
FIG. 1 shows an exemplary interface provided to a user.

FIG. 1 shows an exemplary interface 100 provided to a user by a device in one implementation. As shown in FIG. 1, interface 100 may include, for example, a display region 110, a comment region 120, and a recommendation region 130.

Interface 100 is generally provided for the benefit of a user of a client device via a client application program, process, or interface that is executed at the client device for enabling data communications with one or more other devices via a network. For example, interface 100 may be implemented on a client device executing a client application program to access a functionality of a web application. Interface 100 may be provided to the user of the client device through, for example, a web browser application executable at the client device. Alternatively, interface 100 may be a dedicated application program that is installed and executable at client device to enable the user to access relevant web application functionality.

Display region 110 may receive data associated with digital content (e.g., the digital content are downloaded or streamed to interface 100) and may process the data to present a visual representation associated with the digital content. For example, display region 110 may present an image or a series of images (e.g., a movie) associated with the digital content. An associated audio representation, such as spoken dialog and/or music, may also be presented in connection with the visual representation presented in display region 110.

Comment region 120 may display a comment received from the user, and the comment may relate to the digital content presented in display region 110. For example, comment region 120 may include a comment entry box 122 through which the user may submit a comment 124. Comment region 120 may display, for example, data related to other comments 126 received from other users (e.g., users associated with other client devices) in connection with the digital content presented in display region 110. Comments 124 and 126 may be exchanged during the presentation of the digital content or may be received after the presentation of the digital content.

Comments 124 and/or 126 may include text expressing an opinion related to the digital content presented in display region 110 (e.g., whether a commenter liked or disliked the digital content). In the example show in FIG. 1, the comment 124 ("This movie is great!") by User A, associated with interface 100, indicates that User A liked the digital content. Continuing with the example of FIG. 1, comments 126 indicate that User B liked the digital content ("I love this movie") and User C disliked the digital content ("This ending is boring").

A comment 124/126 may be associated with a particular portion of the digital content. For example, the comment 124/126 may be associated with a portion of the digital content being presented via display region 110 when the comment 124/126 is received. In another implementation, the comment 124/126 may be processed to determine a relevant portion of the digital content based on the contents of the comment 124/126. In the example shown in FIG. 1 the comment 126 by User B ("This ending is boring.") indicates a dislike of the ending of the digital content.

In one implementation, comment region 120 may include a graphical interface that receives a rating of a portion of the digital content. For example, comment region 120 may allow a user to click on or otherwise select between zero and five starts, with zero stars indicating a strong dislike and five stars indicating a strong positive preference (or like) for the digital content. Comment region 120 may also allow a user to submit a numerical rating (e.g., a number between zero and five).

Continuing with FIG. 1, recommendation region 130 may present a recommendation 132 to the user. Recommendation 132 may be generated based on comments 124 and 126 associated with the digital content displayed in display region 110. The recommendation 132 may identify one or more other digital content to the user. The recommendation 132 may be generated based on comparing comments 124 and 126 to identify a set of comments 126 that are similar to comments 124 by the user, and then identifying particular users associated with the identified set of comments 126. In the example shown in FIG. 1, it may be inferred that User A and User B have similar interests and/or tastes since User A and User B both submitted positive comments 124 and 126 with respect to the digital content presented via display region 110. Similarly, it may be inferred that user A and User C have different interests and/or tastes since User C have submitted a negative comment 126 with respect to digital content liked by User A.

Continuing with the example shown in FIG. 1 (in which User A and User B submit similar comments and User A and User C submit dissimilar comments with respect to the particular digital content), recommendation 132 may identify digital content viewed and/or positively commented upon by User B. Due to the similarities in the comment 124 and the comment 126 submitted by User A, it may be inferred that User A and User B share similar preferences and likes regarding digital content.

Recommendation 132 may identify multiple other digital contents (shown in FIG. 1 as "Movie 1," "Movie 2," and "Movie 3"). The digital content, identified in recommendation 132, may be ranked (or ordered) based on various criteria. For example, recommendation 132 may order the digital content alphabetically based on the respective identifiers or other metadata associated with the digital content (e.g., people, places, genres, awards, etc. associated with the digital content). Continuing with the example shown in the FIG. 1, digital content liked by User B (and disliked by User C) may be ranked higher than digital content liked by User C (and disliked by User B) based on the similarities between User A and User B with respect to the digital content presented in display region 110.

In another implementation, the digital content identified in recommendation 132 may be also be ranked based on other criteria. For example, as shown in FIG. 1, recommendation region 130 may include a query entry box 134 to receive a query from the user. The query may include a character string specifying, for example, an identifier (e.g., a title or a portion of the title), people (e.g., actors, singers, or writers), places (e.g., settings), genres, awards, etc., associated with the digital content. The digital content identified in recommendation 132 may be ranked based or the query (i.e., digital content associated with or matching the query being ranked higher than other digital content).

Although FIG. 1 shows exemplary aspects of interface 100, in other implementations, interface 100 may present less data, different data, differently arranged data, or additional data than depicted in FIG. 1. As an example, display region 110 may be presented on a first device (e.g., on a television), and recommendation region 130 may be presented in a separate device (e.g., on a smart phone, remote control, tablet, laptop computer, etc.). In another implementation, comment region 120 and recommendation region 130 may be combined such that recommendations 132 may be presented proximate to a corresponding comment 124 or 126. For example, different recommendations 132 may be determined based on different comments 126, and the different recommendations 132 may be presented near the corresponding comments 126.

Figure 2:
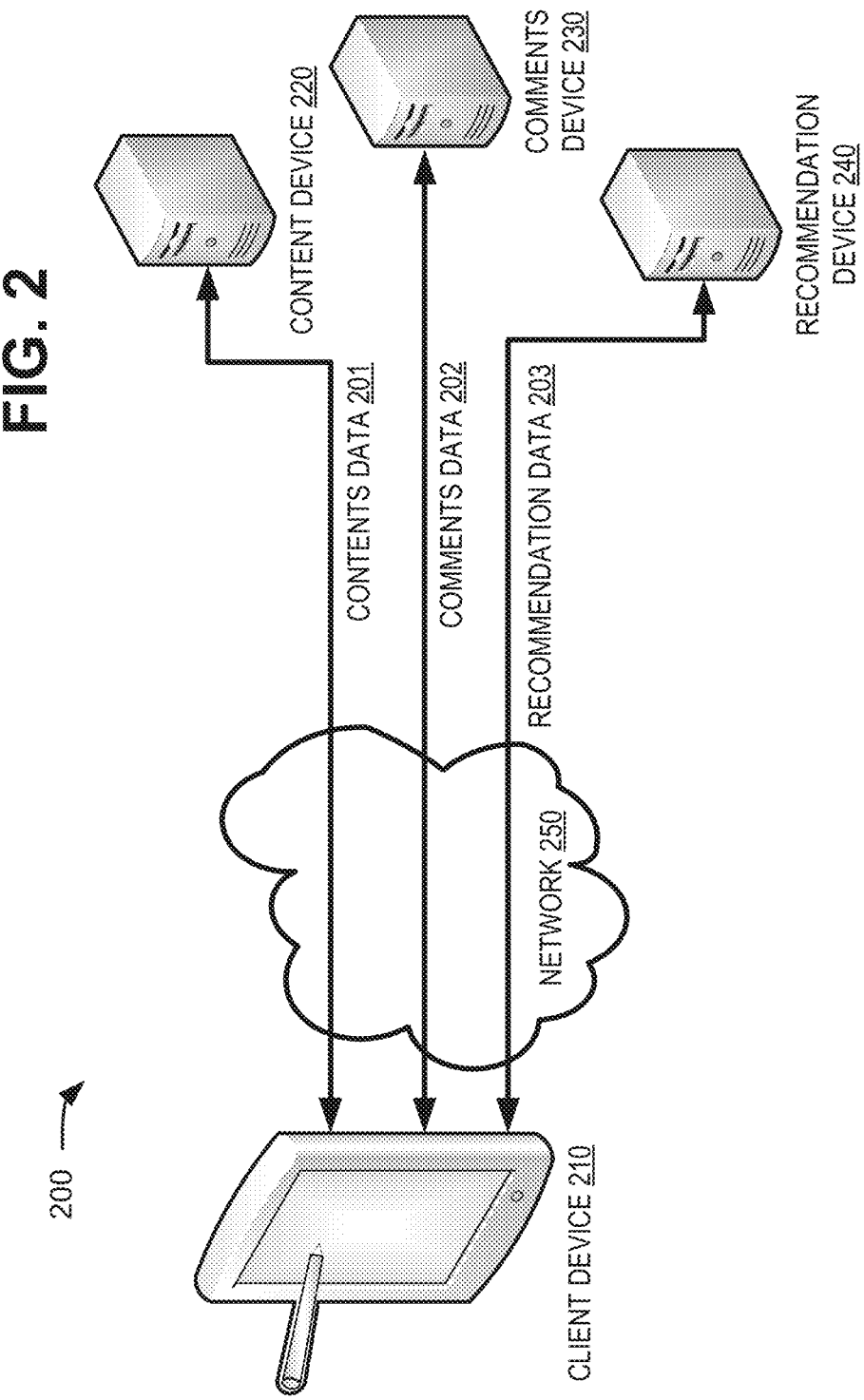
FIG. 2 shows a schematic diagram of an exemplary system for presenting the interface of FIG. 1.

FIG. 2 shows a schematic diagram of an exemplary system 200 for presenting interface 100 of FIG. 1 in one implementation. As shown in FIG. 2, system 200 may include a client device 210 that presents interface 100 shown in FIG. 1. In connection with presenting interface 100, client device 210 may exchange, for example, contents data 201 with content device 220, comments data 202 with comments device 230, and recommendation data 203 with recommendation device 240 via network 250 when presenting interface 100.

Client device 210 may include a device that is capable of communicating over network 250. Client device 210 may include, for example, a telephone, a wireless device, a smart phone, a tablet, a personal digital assistant (PDA), a laptop computer, a global positioning system (GPS) or mapping device, a gaming device, or other types of computation or communication devices. Client device 210 may also include a set-top box (STB), a connected television, a laptop computer, a tablet computer, a personal computer, a game console, or other types of computation and/or communication devices. In one implementation, client device 210 may include a client application that allows a user to interact with content device 220 to order and/or receive broadcast content and special-order (e.g., VOD, pay-per-view event, etc.) content. In some implementations, client device 210 may also include a client application to allow video content to be presented on an associated display.

Client device 210 and content device 220 may exchange contents data 201 via network 250. Contents data 201 may include, for example, the digital content to be displayed by client device 210 (e.g., in display region 110). Contents data 201 may also include a listing of digital content available from content device 220 and/or pricing information regarding the available digital content. Contents data may also include a request from client device 210 for the digital content, such as a selection from recommendation 132. In one implementation, contents data 201 may also include data or a program related to accessing digital content through content device 220. For example, contents data 201 may identify an encoding scheme (e.g., a codec) used for the digital content and/or may include a program for handling the encoding scheme.

Client device 210 and comments device 230 may exchange comments data 202 via network 250. Comments data 202 may include, for example, data associated with comments 124 received by client device 210 from an associated user. Comments device 230 may forward the comments 124 to other client devices. Comments data 202 may further include, for example, data associated with comments 126 received from other users (i.e., User B and User C in FIG. 1). For example, comments data 202 may include contents of the comments 124 and 126, and metadata associated with the comments, such as a time when the comments are submitted, data identifying person and/or device associated with the comments, etc. Client device 210 may present comments region 120 based on the comments data 202.

In one implementation, comments device 230 may be used in connection with a "chat room" in which different users interact with respect to a specific topic. In another implementation, comments device 230 may operate in connection with social media. For example, comments 124 and/or 126 may be collected from Internet forums, a user's blogs, social networks, podcasts, picture-sharing, wall-posting, music-sharing, etc.

Recommendation device 240 may receive comments data 202 and identify a commentator submitting comments 126 similar to comments 124 submitted by a user associated with client device 210. For example, as described above with respect to recommendations region in FIG. 1, recommendation device 240 may review comments 124 to determine particular digital content liked by the user, and review comments 126 to identify other users that like the same or similar digital content. For example, recommendation device 240 may identify comments 124 and 126 that include (1) positive language (e.g., "funny," "enjoy," great," "exciting," etc.) indicating that a user liked the particular digital content or (2) negative language (e.g., "boring," "bad," terrible," "awful," etc.) indicating that the user disliked the particular digital content. Recommendation device 240 may further identify other digital content liked and/or viewed by the identified commentator, and form recommendation data 203 based on the identified other digital content.

Network 250 may include any network or combination of networks. In one implementation, network 250 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Alternatively or in addition, network 250 may include a contents delivery network having multiple nodes that exchange data with client device 210. Although shown as a single element in FIG. 2, network 250 may include a number of separate networks that function to provide communications and/or services to client device 210.

In one implementation, network 250 may include a closed distribution network. The closed distribution network may include, for example, cable, optical fiber, satellite, or virtual private networks that restrict unauthorized alteration of contents delivered by a service provider. For example, network 250 may also include a network that distributes or makes available services, such as, for example, television services, mobile telephone services, and/or Internet services. Network 250 may be a satellite-based network and/or a terrestrial-based network. In implementations described herein, network 250 may support television services for a customer associated with client device 210.

Although FIG. 2 shows exemplary components of system 200, in other implementations, system 200 may include fewer components, different components, differently arranged components, or additional components than depicted in FIG. 2. As an example, system 200 may include one or more intermediate devices, such as a router, firewall, etc. (not depicted), that connect client device 210 to network 250.

Furthermore, although a single client device 210 is shown in FIG. 2, system 200 may include several client devices 210. For example, a single user may be associated with multiple client devices 210 such that comments by the single user may be received from the multiple client devices 210 and considered when determining recommendation data 203. In another implementation, system 200 may include multiple client devices 210 associated with different users. Recommendation device 240 may then send different recommendations 132 to different client devices 210 based on comments associated with the associated different users.

Furthermore, it should be appreciated that tasks described as being performed by two or more other components of device system may be performed by a single component, and tasks described as being performed by a single component of system 200 may be performed by two or more components. For example, in a one implementation, recommendation device 240 may be a component of comments device 230.

Figure 3:
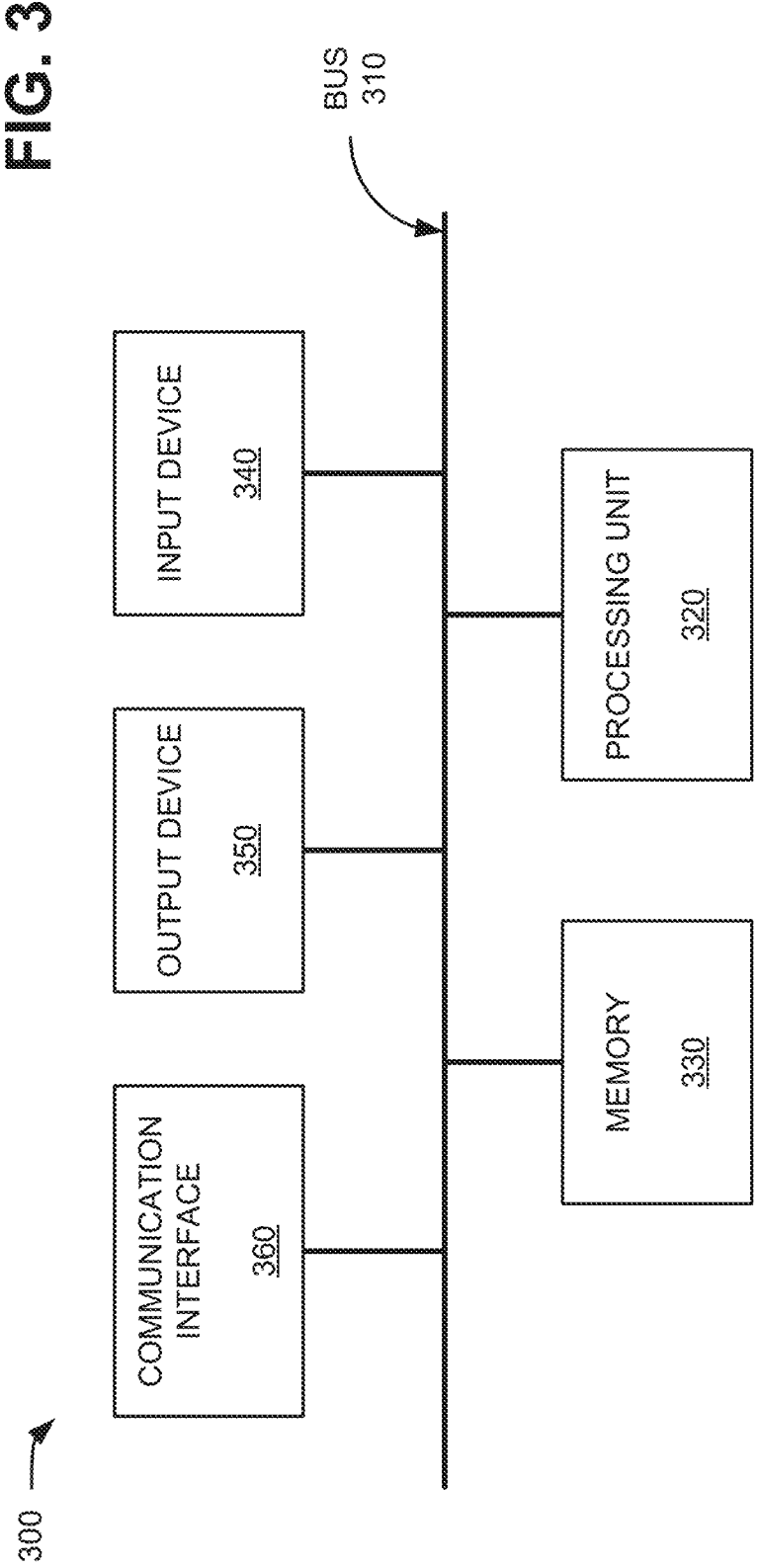
FIG. 3 is a diagram of exemplary components of a device that may correspond to a component of the system of FIG. 2.

FIG. 3 is a diagram of exemplary components of a device 300 that may correspond, for example, to a component of system 200. For example, a component of system 200 may be implemented and/or installed as software, hardware, or a combination of hardware and software in device 300. In one implementation, device 300 may be configured as a network device. In another implementation, device 300 may be configured as a computing device. As shown in FIG. 3, device 300 may include, for example, a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), and/or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of system 200.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, a display may not be included in device 300. In these situations, device 300 may be a "headless" device that does not include an input device.

FIG. 4 shows an exemplary table 400 that may be stored by recommendation device 240 in one implementation. Table 400 may include, for example, user entries 410, contents entries 420, and preference entries 430. While table 400 is displayed in FIG. 4 as including three user identifier entries 410, five contents entries 420, and thirteen preference entries 430 for purposes, it should be appreciated that any number of entries 410, 420, and 430 may be included in table 400.

User entries 410 may store character strings or other data, such as images, addresses telephone numbers, customer numbers, etc., identifying a user associated with client device 210 and other users submitting comments received by client device 210. For example, in FIG. 4, user entries 410 identify "User A," "User B," and "User C." User entries 410 may further include other information associated with the users, such as information identify corresponding client devices 210 (e.g., network addresses, serial numbers, customer numbers, etc.), geographic locations associated with the users, demographic information associated with the users, etc. The data in user entries 410 may be determined based on, for example, data associated with the comments (e.g., the identifying data may be included in comment data 202), other data received from client devices 210 (e.g., registration information), or stored data identifying users associated with client devices 210.

Continuing with table 400 in FIG. 4, content entries 420 may store character strings identifying the digital content (e.g., identifying the title). In the example shown in FIG. 4, table 400 includes content entries 420 associated with Movies 1-5. The data in content entries 420 may be determined based on, for example, received comments (e.g., data in the comments identifying the relevant digital content). In another implementation, a comment 124 or 126 displayed in comment region 120 in FIG. 1 may be tagged with information identifying a time when the comment 124 or 126 is received and/or a corresponding portion of the particular digital content (e.g., a portion of the digital content being presented in display region 110 when the comment 124/126 is submitted), and this information may be stored in content entries 420.

In another implementation, content entries 420 may be obtained from a third-party source. For example, recommendation device 240 may generate a query to an internet search engine to determine at least a portion of content entries 420. The query may be generated based on data included in the comments and/or data included in user entries 410.

Continuing with table 400, preference entries 430 (shown in FIG. 4 as preference entries 430-A-1 through 430-A-3, 430-B-1 through 430-B-5, and 430-C-1 through 430-C-5) may include an indication of whether users, identified in user entry 410, liked or disliked digital content identified in contents entry 420. For example, preference entries 430-A-1, 430-A-2, and 430-A-3 in table 400 indicate that User A liked Movie 1 and Movie 2, but disliked Movie 3.

Alternatively or in addition, preferences entries 430 may identify other opinions regarding the digital content (e.g., whether a movie was action-packed, serious, scary, interesting, funny, etc.). As described in greater detail below, a recommendation may also be generated based on these other opinions. For example, a recommendation may be determined by clustering users who submit comments categorizing correspond portions of digital content (e.g., users having similar senses of humor).

The information stored in preference entries 430 may be determined by processing comments by users identified in user entries 410 with respect to digital content identified in content entries 420. For example, recommendation device 240 may store information associating particular words used in comments 124 and 126 with preferences. For example, recommendation device 240 may store information identifying a set of approving words that indicate a like of the digital content and a set of disapproving words that indicating a dislike of the digital content. To generate data preference entries 430, recommendation device 240 may process comments from users identified in user entries 410 to determine the users' opinion by identifying the presence of approving and/or disapproving words within the comments.

Recommendation device 240 may also populate one or more of preference entries 430 based on other factors. For example, recommendation device 240 may infer that a user likes the digital content if, for example, the user consumes (i.e., reads, views, listens to, etc.) the entire digital content. Recommendation device 240 may also provide an interface (i.e., included in the interface 100), such as a graphical user interface (GUI), that allows a user to directly indicate an opinion regarding the digital content. For example, comments region 120 of interface 100 may include an entry area that allowed a user to grade or submit a numerical score to the digital content (e.g., allow the user to rate a movie between 1 and 5, with "1" indicating a strong dislike of the digital content, and "5" reflecting a strong like of the digital content.

In the example shown in FIG. 4, Users A and B share similar opinions about Movies 1-3 (as reflected in preference entries 430-B-1 through 430-B-3), whereas Users A and C have different opinions with respect to Movies 1-3 (as reflected in preference entries 430-C-1 through 430-C-3). As further shown in FIG. 4, User B liked Movie 4 (as reflected in preference entry 430-B-4) and disliked Movie 5 (as reflected in preference entry 430-B-5), whereas User C disliked Movie 4 (as reflected in preference entry 430-C-4) and liked Movie 5 (as reflected in preference entry 430-C-5).

Continuing with the example of FIG. 4 and as described in greater detail below with respect to FIGS. 5-7, recommendation 132 may identify digital content liked by User B and/or disliked by User C (i.e., Movie 4). In another implementation, recommendation 132 may further identify Movie 5, but rank it below Movie 4 based on User B disliking it and/or User C liking it.

Although FIG. 4 shows sample entries that may be included in table 400. In other implementations, table 400 may include fewer entries, different entries, differently arranged entries, or additional entries than depicted in FIG. 4. For example, table 400 may include entries associated with metadata associated with the digital content, such as information identifying genres, performers, settings, awards, etc. associated with the digital content. Preference entries 430 may further identify users' opinions with respect to the metadata (e.g., opinions regarding different genres, performers, etc.).

FIG. 5 is a flow diagram of an exemplary process 500 for recommending digital content based on user comments regarding other digital content. In one implementation, process 500 may be performed by recommendation device

240. In other implementations, process 500 may be performed using recommendation device 240 and one or more other devices.

Process 500 may include receiving comments from a user regarding digital content (block 510). For example, as described above with respect to FIGS. 1 and 2, comments 124 from an associated user may be received via interface 100. In another implementation, the comments may be obtained, for example, via Internet forums, a user's blogs, social networks, podcasts, picture-sharing, wall-posting, music-sharing, etc.

Continuing with process 500, a user's preferences regarding digital content may be determined based on the comments (block 520). In block 520, recommendation device 240 may determine a first set of digital content liked by the user and a second set of digital content disliked by the user. To determine the user's preferences, recommendation device 240 may parse terms included in the comments and classify the digital content as liked or disliked based on the parsed terms. For example, recommendation device 240 may determine whether a comment includes an approving term indicating a like of the digital content or a disapproving term indicating a dislike of the digital content.

Recommendation device 240 may determine the extent of a user's like/dislike of digital content based on language used in the comments. For example, certain terms ("love," "hate," "terrible," etc.) may indicate stronger like/dislike than other terms ("okay," "all right," "so-so," etc.). The extent of a user's like/dislike of digital content may be also determined based on a number of comments generated by the user. For example, recommendation device 240 may determine that a user prefers a digital content receiving more positive comments and/or less negative comments from the user.

The recommendation device 240 may be trained to dynamically classify terms based on processing sample comments from a group of users having known preferences regarding particular digital content. For example, terms from comments from users liking the particular digital content may be processed to identify approving terms, and terms from comments from other users disliking the particular digital content may be processed to identify disapproving terms.

If the user's comments associated with a particular digital content include both approving and disapproving terms, recommendation device 240 may determine the user's preference regarding the particular digital content based on, for example, respective counts of the approving and disapproving terms. For example, recommendation device 240 may determine that the user liked the particular digital content when the comments include more approving terms than disapproving terms. Alternatively or in addition, if a user is associated with both approving comments (i.e., comments containing approving terms) and disapproving comments (i.e., comments containing disapproving terms), recommendation device 240 may determine that the user liked the particular digital content when there are more approving comments than disapproving comments.

Recommendation device 240 may further identify the user's preferences based on other information. Recommendation device 240 may infer that a user liked a particular digital content based on the user's use of the digital content. For example, recommendation device 240 may infer that a user liked a digital book if the user reads the entire digital book, or may infer that the user disliked the digital book if the user does not finish the digital book. Similarly, recommendation device 240 may infer that a user liked movie if the user watched the entire program one or more times and disliked the digital book if the user does not finish viewing the movie.

Returning to process 500 in FIG. 5, recommendation device 240 may cluster the user with other users based on the determined preferences (block 530). For example, recommendation device 240 may group a user with other users who have similar preferences. For example, recommendation device 240 may identify other users who like at least a threshold number of the digital content liked by the user and/or dislike at least a threshold number the digital content disliked by the user. For example, two users may be clustered if they like the same ten digital contents. Recommendation device 240 may also identify other users who like at least a threshold percentage of the digital content liked by the user and/or dislike at least a threshold percentage of the digital content disliked by the user. For example, a first user may be clustered with a second user if the first user likes at least half (50%) of the digital content liked by the second user.

Continuing with the example of table 400 in FIG. 4, User A may be clustered with User B based on the similarities in the preferences entries 430 of User A and User B with respect to Movies 1-3. Similarly, User A and User C may be grouped into different clusters based on the differences between the preferences entries 430 of User A and User C with respect to Movies 1-3.

While a user's preferences with respect to particular digital content are generally discussed as being extracted from comments, it should be appreciated that a preference can also be determined based on additional data. For example, recommendation device 240 may provide an interface to receive an input that regarding user's opinion about digital content. For example, a user may submit a number, such as rating, or other information (e.g., selections of a graphical symbol such as a thumbs up or a thumbs down) indicating the user's opinion of the digital content.

Figure 6:
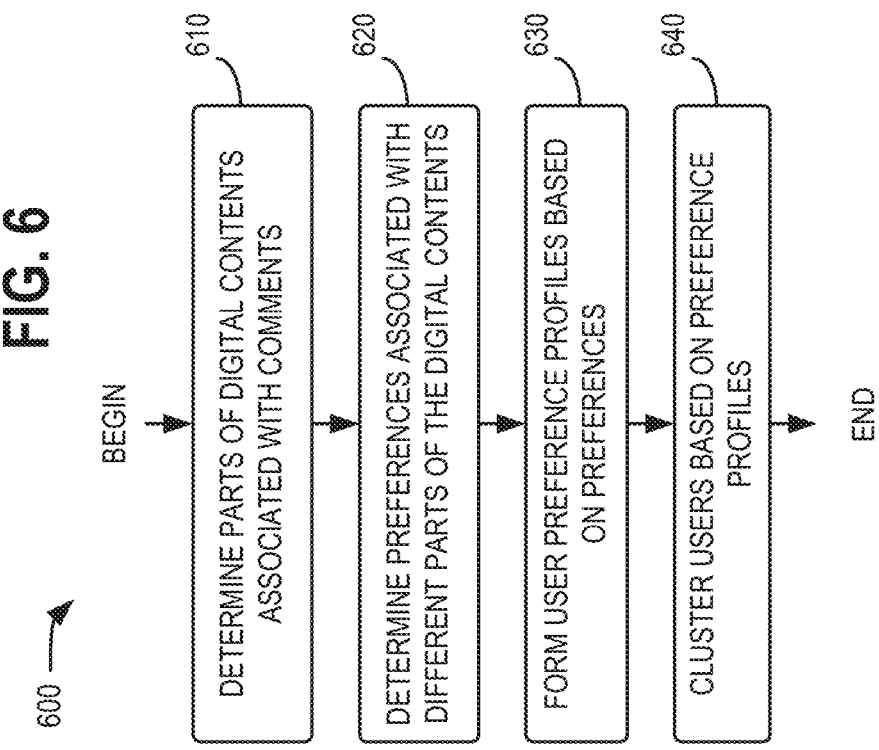
FIG. 6 is a flow diagram of an exemplary process for clustering users based on the determined preferences determined from user comments.

FIG. 6 is a flow diagram of an exemplary process 600 for clustering the user with other users based on the determined preferences in block 530. In one implementation, process 600 may be performed by recommendation device 240. In other implementations, process 600 may be performed using recommendation device 240 and one or more other devices.

Process 600 include determining parts of digital content associated with a user's comments (block 610). For example, a comment may be associated with a time that the comment is received (e.g., the comment is stored with data indicating the time), and recommendation device 240 may determine a part of the digital content associated with the time. For example, recommendation device 240 may determine a portion of the digital content being presented via display region at the time.

In another implementation, recommendation device 240 may analyze contents of a comment to determine whether the comment relates to a particular portion of the digital content. For example, recommendation device 240 may determine whether the comment includes language that directly references a portion of the digital content (e.g., "beginning," "introduction," "middle," "ending," "refrain," "chorus," etc.).

Continuing with process 600, recommendation device 240 may determine preferences associated with the different parts of the digital content (block 620). For example, recommendation device 240 may parse terms included in a comment associated with a portion of the digital contents, and determine the user's opinion about the portion based on the parsed terms. For example, recommendation device 240 may determine whether a comment includes an approving term indicating a like of the corresponding portion of the digital content or a disapproving term indicating a dislike of the portion of the digital content. Recommendation device 240 may further identify the user's preferences based on the user's action with respect to the portion of the digital content. For example, recommendation device 240 may infer that a user disliked a portion of the digital content if the user skipped the portion.

Continuing with process 600 in FIG. 6, recommendation device 240 may form user preference profiles (block 630). A preference profile for a user may represent a user's opinion regarding different portions of the digital content.

FIGS. 8A-8C show graphs 800 depicting different exemplary preference profiles 810-A, 810-B, and 810-C (referred to collectively as preference profiles 810 and individually as preference profile 810) that may be generated in block 630 in implementations of the present application. In FIGS. 8A-8C, preference profiles 810 reflect different preference levels 820 (i.e., the extent that a user liked or disliked the digital content) at different times 830 (or portions of the digital content).

Preferences for a portion of digital content may be determined based on comments associated with that portion. A portion may reflect, for example, a particular time frame (e.g., a one minute section) of the digital content or may reflect a fraction (e.g., a tenth of the digital contents). As described above, a comment 124/126 may be associated with a corresponding portion of the digital content (e.g., a portion of the digital content being displayed in content region 110 when the comment is received).

A portion of the digital contents may be scored based on values assigned to associated comments, and comments 124 and 126 may be scored based on different levels of like/dislike (or other criteria being evaluated). For example, comments may be scored with scores between −10 and 10, with a value of −10 indicating an extremely strong dislike, a value of 0 indicating a neutral opinion, and a value of 10 indicating a strong like. A comment 124/126 may be scored based on the included terms used in the associated text. For example, a comment 124/126 including a strongly negative term, such as "abysmal," may be associated with a −10 value, and another comment including a strongly negative term, such "stupendous," may be associated with a 10 value. If the comment 124/126

For example, profile 810-A shown in FIG. 8A indicates that the user had a first, high preference level with respect to a portion of digital content associated with time $T_1$ and had a second, lower preference level with respect to a portion of digital content associated with time $T_2$. Profile 810-A may reflect, for example, that the user submitted a positive comment ("This part is awesome") at time $T_1$ and submitted a negative comment ("This part is boring") at time $T_2$.

FIG. 8B shows a profile 810-B that indicates, similar to profiled 810-A, that the user liked the digital content with a first preference level at time $T_1$ and with a second, lower preference level at time $T_2$. Profile 810-B may further include the user's preference level 820 at other times 830. Profile 810-B generally suggests, for example, that the associated user liked a beginning portion of the particular digital content more than an end portion.

FIG. 8C shows a profile 810-C that indicates that the user liked the digital content with a first preference level at time $T_1$ and with a second, higher preference level at time $T_2$. More specifically, profile 810-C generally suggests, for example, that the associated user liked the beginning portion of the particular digital content less than the end portion.

Profiles 810-B and 810-C may be generated, based on multiple comments received from the user. Profiles 810-B and 810-C may also be generated by statistically analyzing comments associated with particular preference levels 820 and particular times 830 to generate a curve associated with profiles 810-B and 810-C. For example, curve fitting techniques may be used to construct a curve, or mathematical function, that has the best fit to a series of data points associated with the comments. Curve fitting may include, for example, performing interpolation to connect the data points, smoothing to construct a curve that best fits the data points, and/or extrapolation to determine a fitted curve beyond the range of the observed data (e.g., estimating preferences levels associated with portions of the digital content in which the user did not submit comments).

Profiles 810-B and 810-C may also be generated using other types of statistical techniques, such as regression analysis. For example, interface 100 may request the user to rank or judge different sections of the digital content.

Returning to process 600 in FIG. 6, users may be clustered based on the preference profiles (block 640). For example, users liking similar portions of the digital content may be clustered together. Similarly, users who like/dislike different portions of the same digital content may be separated into different clusters (even if the separated users generally like particular digital content). For example, a particular user who likes a beginning portion of the digital content and dislikes an end portion of the digital content may be clustered (or grouped) with the user associated with preference profile 810-B depicted in FIG. 8B. On the other hand, this particular user (who likes a beginning portion of the digital content and dislikes an end portion of the digital content) may not be clustered with the user associated with preference profile 810-C depicted in FIG. 8C (who liked the end portion of the digital content more than the beginning portion of the digital content).

Recommendation device 240 may compare two preference profiles 810 based on, for example, a difference between preference levels 820 of the two preference profiles 810 at similar times 830. Recommendation device 240 may cluster the two preference profiles 810 when the two preference profiles 810 differ by less than a threshold amount.

Thus, users liking particular digital content may be clustered into different groups if, for example, the user liked different portions of the particular digital content. In the example of an action/comedy movie, users positively commenting on comedic portions of the movie may be clustered in one group, and users positively commenting on action portion sections of the movie may be clustered in another group.

Clustering in block 640 may be further based on comparing preference profiles 810 associated with multiple digital contents. Recommendation device 240 may determine differences between first preference profiles 810 associated with a first user, and second preference profiles 810 associated with a second user. For example, preference scores for portions of the digital content may be determined for the first user and may be compared to preference scores determined for the second user. The first user and the second user may be clustered when the distance between the first and second preference profiles 810 (e.g., a total or average difference in the preference scores) is less than a threshold amount.

Referring again to process 500 in FIG. 5, recommendation device 240 may recommend other digital content to the user based on the clustering (block 540). For example, recommendation device 240 may identify digital content receiving positive comments from users included in a cluster.

In the example of table 400 in FIG. 4 (in which User A is clustered with User B based on the similarities in the preferences of User A and User B with respect to Movies 1-3), Movie 4 may be recommended to User A based on User B's positive comments regarding this digital content.

Figure 7:
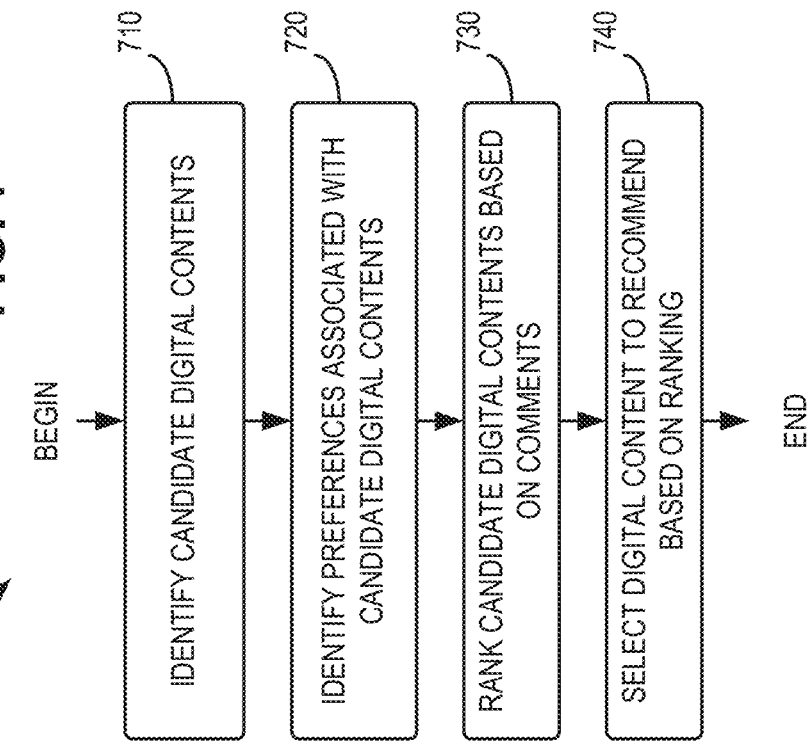
FIG. 7 is a flow diagram of an exemplary process for determining digital content to recommend to a user based on the user's comments.

FIG. 7 is a flow diagram of an exemplary process 700 for determining digital content to recommend to a user based on the user's comments regarding other digital content in block 540. In one implementation, process 700 may be performed by recommendation device 240. In other implementations, process 700 may be performed using recommendation device 240 and one or more other devices.

Process 700 may include identifying candidate digital contents that may be included in a recommendation to a user (block 710). In block 710, recommendation device 240 may identify, for example, digital content that have not been used, viewed, and/or commented upon by a user, but have been used and/or commented upon by other users in a cluster.

In the example of table 400 shown in FIG. 4, Movie 4 and Movie 5 may be identified as possible candidate digital contents to recommend to User A, because no preference entries 430 are associated with User A with respect to these digital contents. Moreover, if User A and User B are grouped in a cluster (based on, for example, the similarities between User A and User B's preferences with respect to Movies 1-3 as reflected by preference entries 430-A-1 through 430-A-3 and preference entries 430-B-1 through 430-B-3), Movie 4 and Movie 5 may be selected as candidate digital contents based on User B submitting comments related to Movie 4 and Movie 5 (as reflected by preference entries 430-B-4 and 430-B-5).

In another implementation, the candidate digital contents identified in block 710 may correspond to digital content available through a service provider, a content provider, a merchant, etc. For example, recommendation device 240 may identify digital content that are available to a user and have not been previously accessed by the user. Referring to FIG. 2, recommendation device 240 may interface with content device 220 to identify digital content that are available to but not previously accessed by client device 210.

Continuing with FIG. 7, process 700 may also include identifying preferences of other users with respect to the candidate digital contents (block 720). In block 720, recommendation device 240 may determine users that like the candidate digital contents and other users that dislike the candidate digital contents. For example, recommendation device 240 may evaluate comments from the other users regarding the candidate digital contents. Recommendation device 240 may evaluate the comments in similar manner to determining a user's preferences regarding digital content based on received comments in block 520 of FIG. 5 (e.g., by determining whether the comments include approving or disapproving words.

Continuing with process 700 in FIG. 7, recommendation device 240 may rank candidate digital contents at least partially based on the preferences (block 730). For example, recommendation device 240 may rank the candidate digital contents based on the number or percentage of members of a cluster that like or dislike the candidate digital contents.

In one implementation, recommendation device 240 may rank the candidate digital contents based on the degree of similarity between the preferences of the user and another user that liked or used the candidate digital contents. For example, returning to the example of table 400 in FIG. 4, if User A and User B share similar opinions in 95% of the digital content, Movie 4 (liked by User B, as reflected by preference entry 430-B-4) may be ranked based on a 95% weight. Similarly, if User A and User C share similar opinions in 65% of the digital content, Movie 5 (liked by User C as reflected by preference entry 430-C-5) may be ranked based on a 65% weight. Continuing with this example, if User B and User C both like particular digital content (e.g., a Movie 6 this is not depicted in FIG. 4), Movie 6 may be associated with a composite weight of 95%+65%, or 160%. Thus, Movie 4 may be ranked higher than Movie 5 (since User A appears to share User's B's tastes more than User C), and Movie 6 may be ranked higher than either Movie 4 or Movie 5 since Movie 6 is more universally liked.

In another implementation, candidate digital contents may be ranked in block 730 based on additional factors. For example, a user may submit a query (e.g., query entry box 134 in FIG. 1), and the candidate digital contents may be further ranked based on their relative relevance to the query. For example, if a user submits a query identifying a particular performer, the candidate digital contents may be further weighted and ranked based on whether the performer appears within the digital content.

Candidate digital contents may be ranked in block 730 also based on relationships between the users. For example, a user may define a relationship with another user, and the ranking of candidate digital contents associated with the other user may be adjusted based on the relationship. For example, a user may manually designate another user as a reliable source whose recommendations should be boosted in the rankings, or as an unreliable source whose recommendations should be lowered in the rankings. Recommendation devices 240 may also determine the relationships between the users dynamically. For example, the ranking of candidate digital contents associated with another user that is an acquaintance (e.g., connected to the user via social media, included as a stored contact, etc.) may be boosted relative to other candidate digital contents associated with another user who is not an acquaintance.

In another implementation, candidate digital contents may be ranked in block 730 further based on demographic information or other information associated with the commenting users. For example, if recommendation device 240 is generating a recommendation for a user in a certain age group and living in a particular geographic region, candidate digital contents associated with other users in the age group and the particular geographic region may be ranked higher than other candidate digital contents associated users in other age groups and/or other geographic regions. In another example, a topic of interest associated with the user may be determined (e.g., based on the user's prior purchases of digital content), and the candidate digital contents may be ranked such that digital content associated with the topic of interest are ranked higher relative to other candidate digital contents.

In another implementation, recommendation device 240 may rank the candidate digital contents in block 730 further based on other factors. For example, if a service provider is promoting a particular digital content (e.g., digital content from a particular content provider), recommendation device 240 may rank the promoted digital content higher relative to other candidate digital contents.

Continuing with process 700 in FIG. 7, recommendation device 240 may select a subset of the candidate digital contents based on the ranking (block 740). For example, recommendation device 240 may forward to client device 210, a recommendation 132 identifying a particular quantity of the top-ranked candidate digital contents.

While a series of blocks has been described with respect to FIGS. 5-7, the order of the blocks in FIGS. 5-7 may be modified in other implementations. Further, non-dependent blocks may be performed in parallel. Furthermore, FIGS. 5-7 show exemplary blocks of processes 500-700, and in other implementations, processes 500-700 may include fewer blocks, different blocks, differently arranged blocks, or additional blocks than depicted in FIGS. 5-7.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a processor, comments associated with first digital content, wherein each of the comments are submitted by a first user for a corresponding portion of the first digital content;
   determining, by the processor, opinions attributed to the first user with respect to each of the corresponding portions of the first digital content based on the comments, wherein the attributed opinions correspond to preference levels for each corresponding portion of the first digital content, and wherein determining the attributed opinions includes:
      parsing the comments to identify a term included in the comments, and
      determining the attributed opinions based on the identified term;
   generating, by the processor, a first preference profile including a preference level associated with each corresponding portion of the first digital content, wherein generating the first preference profile includes:
      identifying a series of data points that correspond to the preference levels,
      performing interpolation to generate a curve that connects the data points, and
      performing extrapolation to fit the curve to one or more other portions of the first digital content for which no comment is received from the first user;
   comparing, by the processor, the first preference profile to a plurality of second preference profiles associated with the first digital content for a plurality of second users;
   clustering, by the processor, the first user and at least one of the plurality of second users, wherein the second preference profile for the at least one of the plurality of second users differs from the first preference profile by less than a threshold amount;
   identifying, by the processor, second digital content liked by the at least one of the plurality of second users which has not been accessed by the first user; and
   providing, by the processor and for presentation to the first user, a recommendation identifying the second digital content.

2. The method of claim 1, wherein determining the opinions attributed to the first user includes:
   determining the corresponding portions of the first digital content that are displayed when the comments are received, and
   determining the attributed opinions with respect to the corresponding portions of the first digital content.

3. The method of claim 2, wherein determining the corresponding portions of the first digital content includes:
   determining times when the comments are received; and
   determining the corresponding portions of the first digital content based on the times.

4. The method of claim 2, wherein one or more second users, of the plurality of second users, have a similar opinion as the first user with respect to at least one of the corresponding portions of the first digital content.

5. The method of claim 2, wherein identifying the second digital content includes:
   identifying a plurality of candidate digital content associated with the at least one of the plurality of second users which has not been accessed by the first user; and
   selecting the second digital content from the plurality of candidate digital content based on a comparison of the attributed opinions with respect to the corresponding portions of the first digital content and respective opinions of the at least one of the plurality of second users with respect to the corresponding portions of the first digital content.

6. The method of claim 1, wherein identifying the second digital content includes:
   identifying a plurality of candidate digital content liked by the at least one of the plurality of second users which has not been accessed by the first user; and
   selecting the second digital content from the plurality of candidate digital content based on a respective quantity of the at least one of the plurality of second users that like each of the plurality of candidate digital content.

7. The method of claim 1, wherein each of the corresponding portions of the first digital content spans a timeframe of a same length of time.

8. A device comprising:
a memory configured to store comments associated with first digital content, wherein each of the comments are submitted by a first user for a corresponding portion of the first digital content;
and
a processor configured to:
parse the comments to identify a term included in the comments,
determine opinions attributed to the first user with respect to each of the corresponding portions of the first digital content based on each of the terms,
generate a first preference profile including a preference level associated with each corresponding portion of the first digital content, wherein the processor, when generating the first preference profile, is configured to:
identify a series of data points that correspond to the preference levels,
perform interpolation to generate a curve that connects the data points, and
perform extrapolation to fit the curve to one or more other portions of the first digital content for which no comment is received from the first user,
compare the first preference profile to a plurality of second preference profiles associated with the first digital content for a plurality of second users,
cluster the first user and at least one of the plurality of second users, wherein the second preference profile for the at least one of the plurality of second users differ from the first preference profile by less than a threshold amount,
identify second digital content accessed by the at least one of the plurality of second users which has not been accessed by the first user, and
provide, for presentation to the first user, a recommendation identifying the second digital content.

9. The device of claim 8, wherein the processor, when determining the opinions attributed to the first user, is further configured to:
identify the corresponding portions of the first digital content that are displayed when the comments are received, and
determine the attributed opinions with respect to the corresponding portions of the first digital content.

10. The device of claim 9, wherein the processor, when determining the corresponding portions of the first digital content, is further configured to:
determine times when comments are received, and
determine the corresponding portions of the first digital content based on the times.

11. The device of claim 9, wherein one or more second users, of the plurality of second users, have a similar opinion as the first user with respect to at least one of the corresponding portions of the first digital content.

12. The device of claim 9, wherein the processor, when identifying the second digital content, is further configured to:
identify a plurality of candidate digital content associated with the at least one of the plurality of second users which has not been accessed by the first user, and
select the second digital content from the plurality of candidate digital content based on a comparison of the attributed opinions with respect to the corresponding portions of the first digital content and respective opinions of the at least one of the plurality of second users with respect to the corresponding portions of the first digital content.

13. The device of claim 8, wherein the processor, when identifying the second digital content, is further configured to:
identify a plurality of candidate digital content liked by the at least one of the plurality of second users which has not been accessed by the first user, and
select the second digital content from the plurality of candidate digital content based on a respective quantity of the at least one of the plurality of second users that like each of the plurality of candidate digital content.

14. The device of claim 8, wherein each of the corresponding portions of the first digital content is a timeframe of a same length of time.

15. A non-transitory computer-readable medium to store instructions comprising:
one or more instructions that, when executed by a processor, cause the processor to:
identify comments associated with first digital content, wherein each of the comments are submitted by a first user for a corresponding portion of the first digital content,
parse the comments to determine an opinion attributed to the first user with respect to each of the corresponding portions of the first digital content,
generate a first preference profile including a preference level associated with each corresponding portion of the first digital content, wherein when generating the first preference profile, the processor to:
identify a series of data points that correspond to the preference levels,
perform interpolation to generate a curve that connects the data points, and
perform extrapolation to fit the curve to one or more other portions of the first digital content for which no comment is received from the first user,
compare the first preference profile to a plurality of second preference profiles associated with the first digital content for a plurality of second users,
cluster the first user and at least one of the plurality of second users, wherein the second preference profile for the at least one of the plurality of second users differs from the first preference profile by less than a threshold amount,
identify second digital content accessed by the at least one of the plurality of second users which has not been accessed by the first user, and
provide, for presentation to the first user, a recommendation identifying the second digital content.

16. The non-transitory computer-readable medium of claim 15, wherein the one or more instructions to determine the opinions attributed to the first user further include:
one or more instructions to:
determine the corresponding portions of the first digital content that are displayed when the comments are received, and
determine the attributed opinions with respect to the corresponding portions of the first digital content.

17. The non-transitory computer-readable medium of claim 16, wherein the one or more instructions to determine the corresponding portions of the first digital content further include:
  one or more instructions to:
    determine times when the comments are received, and
    determine the corresponding portions of the first digital content based on the times.

18. The non-transitory computer-readable medium of claim 16, wherein the one or more instructions to identify the second digital content further include:
  one or more instructions to:
    identify a plurality of candidate digital content associated with the at least one of the plurality of second users which has not been accessed by the first user, and
    select the second digital content from the plurality of candidate digital content based on a comparison of the attributed opinions with respect to the corresponding portions of the first digital content and respective opinions of the at least one of the plurality of second users with respect to the corresponding portions of the first digital content.

19. The non-transitory computer-readable medium of claim 15, wherein the one or more instructions to identify the second digital content further include:
  one or more instructions to:
    identify a plurality of candidate digital liked by the at least one of the plurality of second users which has not been accessed by the first user, and
    select the second digital content from the plurality of candidate digital content based on a respective quantity of the at least one of the plurality of second users that like each of the plurality of candidate digital content.

20. The non-transitory computer-readable medium of claim 15, wherein each of the corresponding portions of the first digital content is a timeframe of a same length of time.

* * * * *